(12) United States Patent
Morohashi et al.

(10) Patent No.: US 7,773,373 B2
(45) Date of Patent: Aug. 10, 2010

(54) VIBRATION-DAMPING STRUCTURE FOR AUDIO APPARATUS

(75) Inventors: Tsuyoshi Morohashi, Neyagawa (JP); Mamoru Sekiya, Neyagawa (JP); Norio Etoh, Neyagawa (JP); Norimasa Kitagawa, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 455 days.

(21) Appl. No.: 11/775,993

(22) Filed: Jul. 11, 2007

(65) Prior Publication Data

US 2008/0149805 A1 Jun. 26, 2008

(30) Foreign Application Priority Data

Dec. 25, 2006 (JP) ............................. 2006-347501

(51) Int. Cl.
*G06F 1/16* (2006.01)
(52) U.S. Cl. ................... 361/679.34; 206/723
(58) Field of Classification Search ................. 248/560, 248/562, 634; 361/679.01, 679.02, 679.34, 361/679.35, 679.36; 312/223.2, 319.1; 206/721, 206/723, 320; 330/65
See application file for complete search history.

(56) References Cited

U.S. PATENT DOCUMENTS

| 6,196,516 | B1 * | 3/2001 | Lan .............................. 248/634 |
| 6,819,556 | B2 * | 11/2004 | Chen et al. .............. 361/679.34 |
| 6,859,363 | B1 * | 2/2005 | Chuang .................. 361/679.34 |
| 7,016,189 | B2 * | 3/2006 | Lin .......................... 361/679.34 |
| 2003/0016493 | A1 * | 1/2003 | Hiratomo et al. ............ 361/685 |
| 2007/0133161 | A1 * | 6/2007 | Lin ............................ 361/683 |
| 2007/0285882 | A1 * | 12/2007 | Chen .......................... 361/683 |

FOREIGN PATENT DOCUMENTS

| JP | 62-226697 | 10/1987 |
| JP | 63-142884 | 9/1988 |
| JP | 2-128845 | 10/1990 |
| JP | 06-314888 | 11/1994 |
| JP | 07-054918 | 2/1995 |
| JP | 10-242667 | 9/1998 |
| JP | 11-040957 | 2/1999 |
| JP | 2002-111253 | 4/2002 |
| JP | 2004-213826 | 7/2004 |
| JP | 2006-129147 | 5/2006 |

* cited by examiner

*Primary Examiner*—A. Joseph Wujciak, III
(74) *Attorney, Agent, or Firm*—Renner, Otto, Boisselle & Sklar, LLP (57) ABSTRACT

The present invention provides a vibration-damping structure for an audio apparatus, accommodating a main transformer, which becomes a vibration source when driven, the vibration-damping structure including: a main chassis to which a signal processing board for processing an audio signal is attached, the first chassis defining a portion of an outer shape of an assembly of the vibration-damping structure; a sub-chassis fastened to an inner surface of the main chassis so as to be partially in contact with the inner surface of the main chassis via a plurality of fastening members; and a component accommodating chassis fastened to an inner surface of the sub-chassis so as to be partially in contact with the inner surface of the sub-chassis via other fastening members, wherein the main transformer is fixed to the component accommodating chassis.

5 Claims, 7 Drawing Sheets

VIBRATION-DAMPING STRUCTURE FOR AUDIO APPARATUS

BACKGROUND OF THE INVENTION

1. Field of the Invention

The present invention relates to a vibration-damping structure for an audio apparatus.

2. Description of the Related Art

Conventional home theater systems have become widespread, in which a plurality of speakers are used to provide a realistic sound field in a household use, for example. For example, an audio apparatus called an "AV amplifier" is used in a home theater system for outputting audio signals to a plurality of speakers (see, for example, Patent Document 1 (Japanese Laid-Open Patent Publication No. 2006-129147)).

An audio apparatus such as an AV amplifier includes therein a signal processing board for processing audio signals and an amplifier circuit board for amplifying the audio signals. An AV amplifier is provided with a power transformer for stepping down the input power source voltage and an exhaust fan for discharging the air inside. Such an AV amplifier provided with a tuner is sometimes called an "AV receiver".

Figure 7:
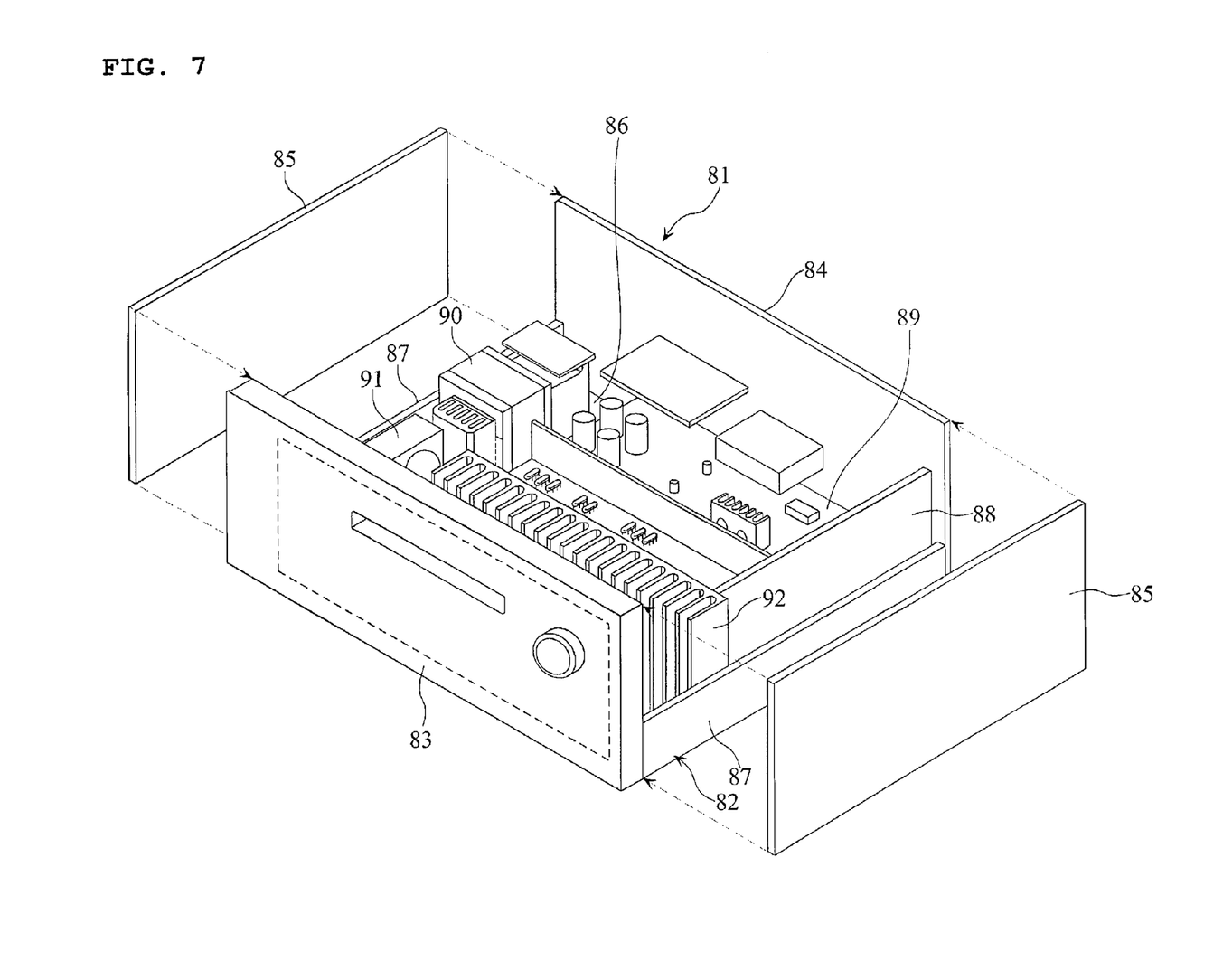
FIG. 7 is a perspective view showing an example of a conventional AV amplifier.

FIG. 7 is a perspective view showing an example of a conventional AV amplifier. Note that FIG. 7 does not show a top cover for covering the top of the assembly. The "front" direction as used herein is the lower left direction in FIG. 7 and the "rear" direction is the upper right direction in the figure. The "right" side and the "left" side are the right side and the left side, respectively, of the AV amplifier as viewed from the "front" direction.

The AV amplifier includes an assembly 81 having a generally rectangular parallelepiped shape. The outer shape of the assembly 81 is generally defined by a lower chassis 82, a front panel 83, a rear panel 84, a pair of left and right side panels 85, and a top cover (not shown). The lower chassis 82 includes a bottom plate member 86 being a flat plate, and a pair of side plate members 87 extending from the left and right end portions of the bottom plate member 86 in a direction perpendicular to the bottom plate member 86.

Provided inside the assembly 81 are a signal processing board 88 and an amplifier circuit board 89 on which electronic components such as capacitors and chip resistors are mounted. Also provided inside the assembly 81 are a power transformer (toroidal transformer) 90, an exhaust fan 91, a heat sink 92, etc. More specifically, components such as the signal processing board 88, the amplifier circuit board 89, the power transformer 90, the exhaust fan 91 and the heat sink 92 are directly fixed on the upper surface of the bottom plate member 86 of the lower chassis 82 described above.

In a home theater system using the AV amplifier, a DVD player (not shown), a television set (not shown) and a plurality of speakers (not shown) are connected to the AV amplifier, for example. When the AV amplifier receives a video signal and an audio signal from the DVD player, the AV amplifier processes (decodes) the audio signal from the DVD player and outputs the processed signal to the speakers, while processing the video signal from the DVD player and outputting the processed signal to the television set.

In this conventional AV amplifier, the power transformer 90 and other components are directly fixed on the upper surface of the lower chassis 82, as described above. When the AV amplifier is powered ON, the power transformer 90 and the exhaust fan 91 start vibrating, and the vibrations are transmitted to the lower chassis 82. Then, the vibrations are transmitted also to the signal processing board 88 and the amplifier circuit board 89, which are fixed on the upper surface of the lower chassis 82. Vibrations of the power transformer 90, etc., influence the audio signal being processed by the signal processing board 88 and the amplifier circuit board 89. Specifically, the audio signal is contaminated with vibration-induced noise, which affects the quality of the sound output from the speakers.

In view of the above, an object of the present invention is to provide a vibration-damping structure for an audio apparatus, capable of damping the vibrations of the power transformer and the exhaust fan to thereby suppress the influence of the vibrations on the audio signal.

SUMMARY OF THE INVENTION

To address the problem set forth above, the present invention provides the following technical solutions.

The present invention provides a vibration-damping structure for an audio apparatus, the vibration-damping structure accommodating a vibrating component, which becomes a vibration source when driven, the vibration-damping structure including: a first chassis to which a signal processing board for processing an audio signal is attached, the first chassis defining a portion of an outer shape of an assembly of the vibration-damping structure; a second chassis fastened to an inner surface of the first chassis so as to be partially in contact with the inner surface of the first chassis via a plurality of fastening members; and a third chassis fastened to an inner surface of the second chassis so as to be partially in contact with the inner surface of the second chassis via other fastening members, wherein the vibrating component is fixed to the third chassis (claim 1).

With such a configuration, even when the vibrating component fixed to the third chassis is driven to vibrate, the vibration is attenuated as it is transmitted to the second chassis, which is fastened to the third chassis so as to be partially in contact with the third chassis via a plurality of fastening members, and is further attenuated as it is transmitted to the first chassis, which is fastened to the second chassis so as to be partially in contact with the second chassis via a plurality of fastening members. Therefore, the vibration of the vibrating component does not influence the signal processing board attached to the first chassis, whereby the vibration does not influence the audio signal processed by the signal processing board. Therefore, it is possible to provide an audio apparatus capable of outputting an audio signal of a desirable sound quality.

In a preferred embodiment, the first chassis includes a generally rectangular first bottom plate member, and a first side plate member extending from each of opposite end portions of the first bottom plate member in a direction perpendicular to the first bottom plate member; the second chassis includes a generally rectangular second bottom plate member and a second side plate member extending from each of opposite end portions of the second bottom plate member in a direction perpendicular to the second bottom plate member, wherein the second side plate members are fixed to inner surfaces of the respective first side plate members of the first chassis, and the second bottom plate member is fixed to an inner surface of the first bottom plate member of the first chassis.

In a preferred embodiment, the third chassis includes a generally rectangular central plate member, an extension member extending from each of opposite end portions of the central plate member in a direction perpendicular to the central plate member, and a parallel plate member extending from an upper end portion of each of the extension members in parallel to the central plate member, wherein a distal end of each parallel plate member is fixed to the second side plate member of the second chassis.

In a preferred embodiment, the vibrating component is a power transformer, and the power transformer is fixed to an upper surface of the central plate member of the third chassis.

In a preferred embodiment, the vibrating component is an exhaust fan; and the exhaust fan hangs down from a lower surface of the parallel plate member of the third chassis.

Other features and advantages of the present invention will become more apparent from the detailed description below taken in conjunction with the accompanying drawings.

DETAILED DESCRIPTION OF THE PREFERRED EMBODIMENTS

Preferred embodiments of the present invention will now be described with reference to the accompanying drawings.

Figure 1:
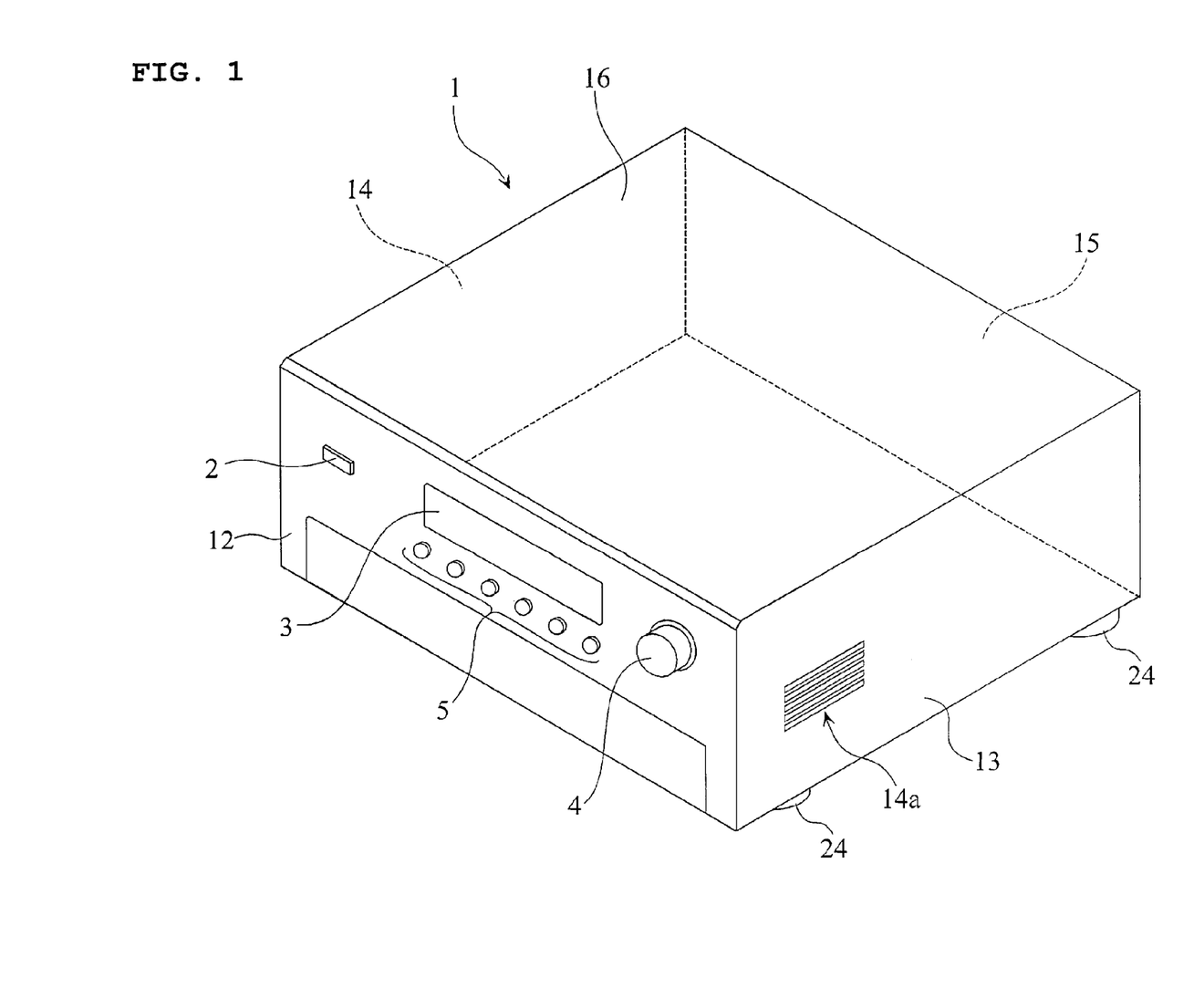
FIG. 1 is a perspective view showing an AV amplifier being an audio apparatus of the present invention.
Figure 2:
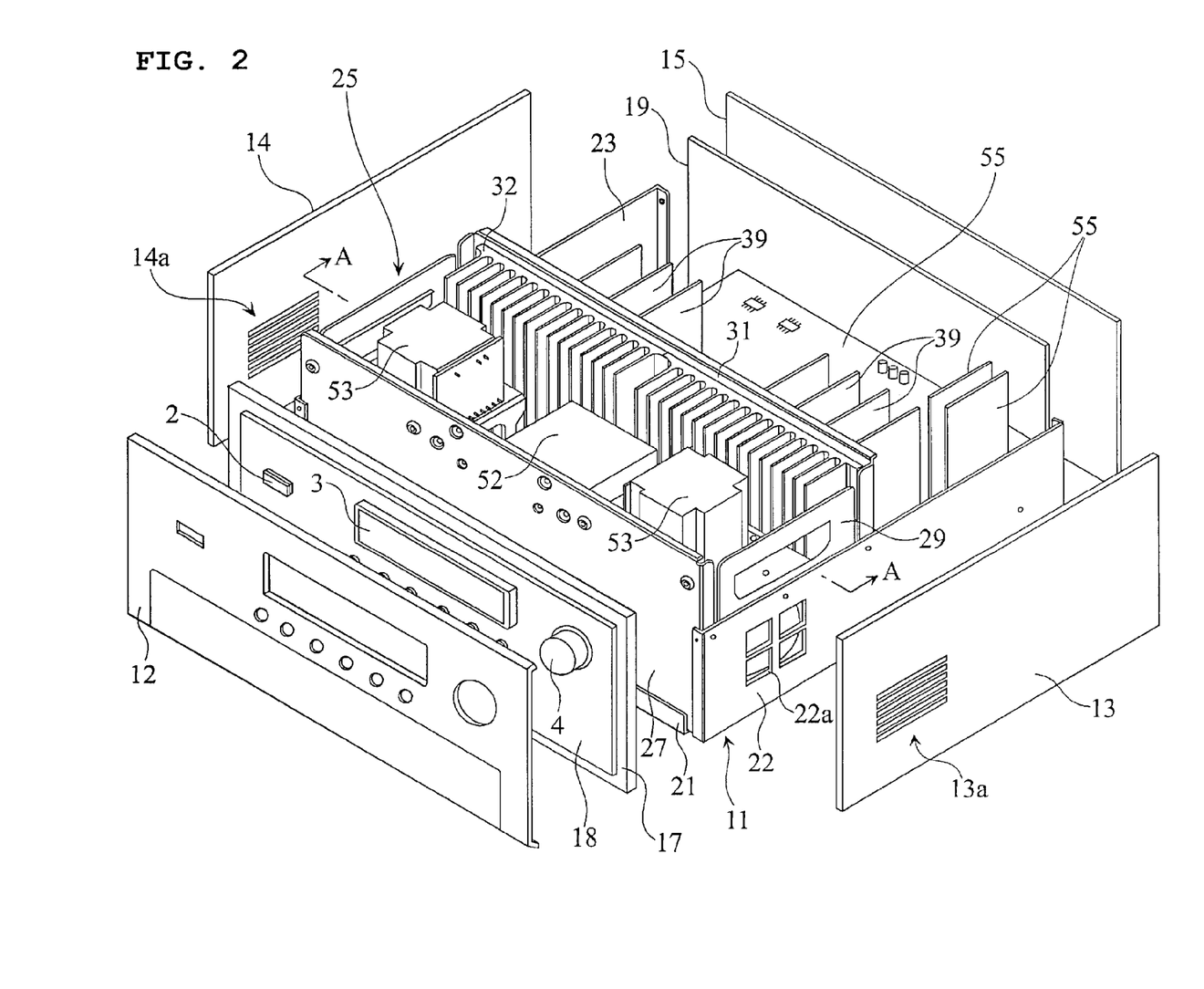
FIG. 2 is an exploded perspective view showing the AV amplifier of FIG. 1.
Figure 3:
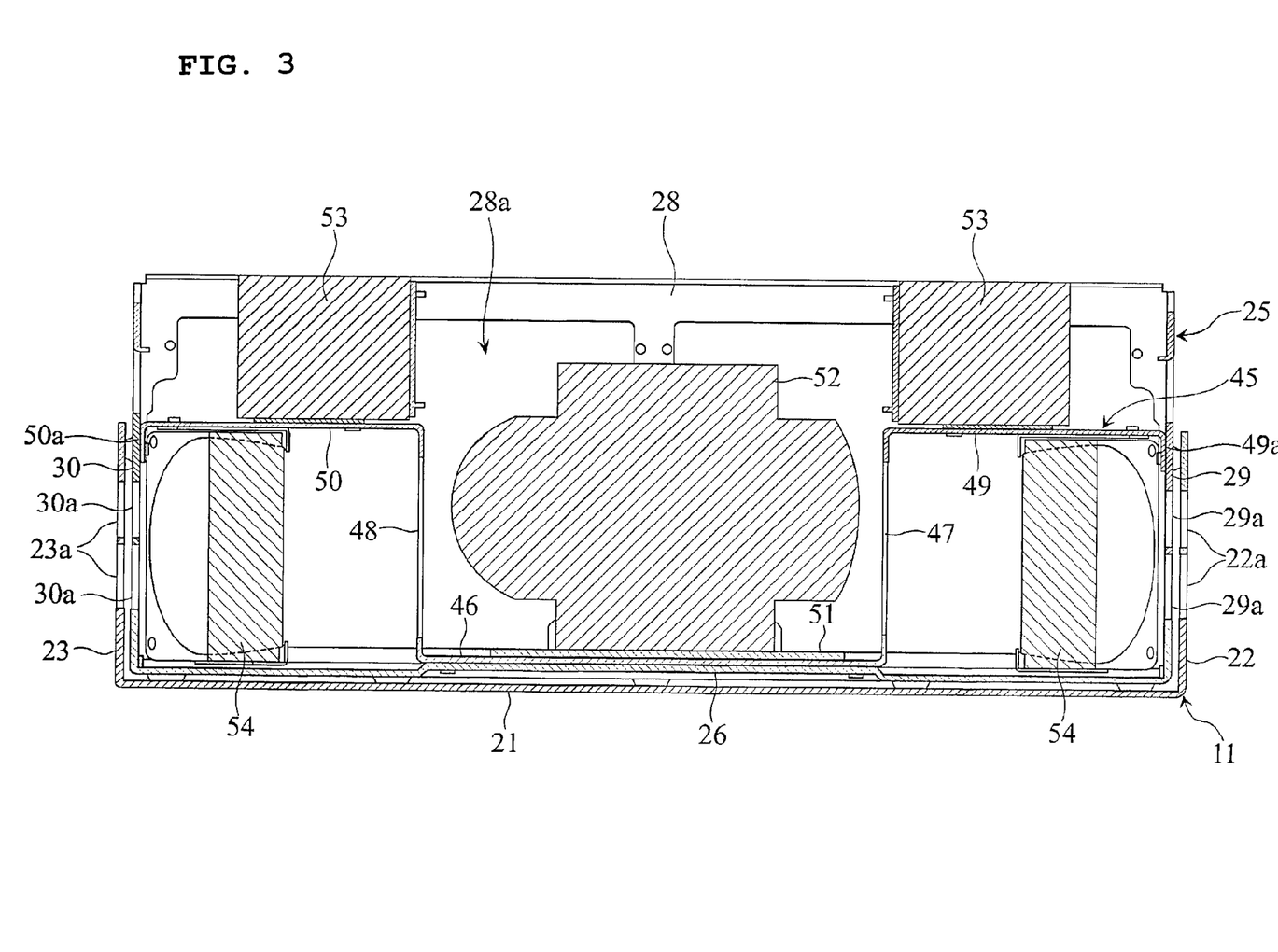
FIG. 3 is a cross-sectional view taken along line A-A of FIG. 2.

FIG. 1 is a perspective view showing an AV amplifier being an audio apparatus of the present invention. FIG. 2 is an exploded perspective view showing the AV amplifier of FIG. 1. FIG. 3 is a cross-sectional view taken along line A-A of FIG. 2. In FIG. 2, a top cover 16 (to be described later) covering the top of an assembly 1 is omitted. In FIG. 3, heat sinks 31 and 32 (to be described later), etc., are omitted. The "front" side as used herein is the lower left direction in FIG. 1 and the "rear" side is the upper right direction in the figure. The "right" side and the "left" side are the right side and the left side, respectively, of the AV amplifier as viewed from the "front" direction.

An "AV amplifier" as used herein is an audio apparatus incorporated in a home theater system, or the like, in which a plurality of speakers are installed around the user to thereby provide a realistic sound field to the user. A DVD player (not shown), a television set (not shown) and a plurality of speakers (not shown) are connected to an AV amplifier, for example. When the AV amplifier receives a video signal and an audio signal from the DVD player, the AV amplifier processes (decodes) the audio signal from the DVD player and outputs the processed signal to the speakers, while processing the video signal from the DVD player and outputting the processed signal to the television set.

As shown in FIG. 1, the AV amplifier includes the assembly 1 having a generally rectangular parallelepiped shape. Provided on the front side of the assembly 1 are a power switch 2, a display section 3 for displaying various operation statuses, a volume control 4 for adjusting the volume of sound, other switches 5 for controlling various operation statuses, etc.

As shown in FIGS. 1 and 2, the assembly 1 includes a main chassis 11 (corresponding to the "first chassis" of the present invention), a front panel 12, a right-side panel 13, a left-side panel 14, a rear panel 15 and the top cover 16 (not shown in FIG. 2), which are fixed together to generally define the outer shape of the assembly 1. The main chassis 11, the front panel 12, and the like, are typically formed by, for example, hard aluminum having a high rigidity. The right-side panel 13, the left-side panel 14 and the top cover 16 may be formed as an integral part.

A front bracket 17 is attached to the reverse side of the front panel 12. A front-side circuit board 18 is provided on one side of the front bracket 17 that is closer to the front panel 12, and the front-side circuit board 18 is provided with the power switch 2, display LEDs forming the display section 3, the volume control 4, the switches 5 (not shown in FIG. 2), etc.

A rear bracket 19 is attached to the reverse side of the rear panel 15. A rear-side circuit board (not shown) is provided on one side of the rear bracket 19 that is closer to the rear panel 15, and the rear-side circuit board is provided with a plurality of signal input/output terminals (not shown).

Ventilation holes 13a and 14a, through which the air is discharged by an exhaust fan 54 to be described later, are provided in the right-side panel 13 and the left-side panel 14, respectively, toward the front side.

The main chassis 11 serves as a support member for supporting electronic components and printed wiring boards, etc., provided in the assembly 1. As shown in FIGS. 2 and 3, the main chassis 11 includes a generally rectangular bottom plate member 21, a right side plate member 22 extending from the right end of the bottom plate member 21 in a direction perpendicular to the bottom plate member 21, and a left side plate member 23 extending from the left end of the bottom plate member 21 in a direction perpendicular to the bottom plate member 21. Specifically, the main chassis 11 is generally U-shaped as viewed in a cross section from the front side. The right side plate member 22 and the left side plate member 23 are provided with ventilation holes 22a and 23a, respectively, that are aligned with the ventilation holes 13a and 14a of the right-side panel 13 and the left-side panel 14. A leg portion 24 having a predetermined height (see FIG. 1) is provided at each corner of the bottom surface of the main chassis 11.

A sub-chassis 25 (corresponding to the "second chassis" of the present invention) is attached to the main chassis 11 on the front side of the bottom plate member 21.

Figure 4:
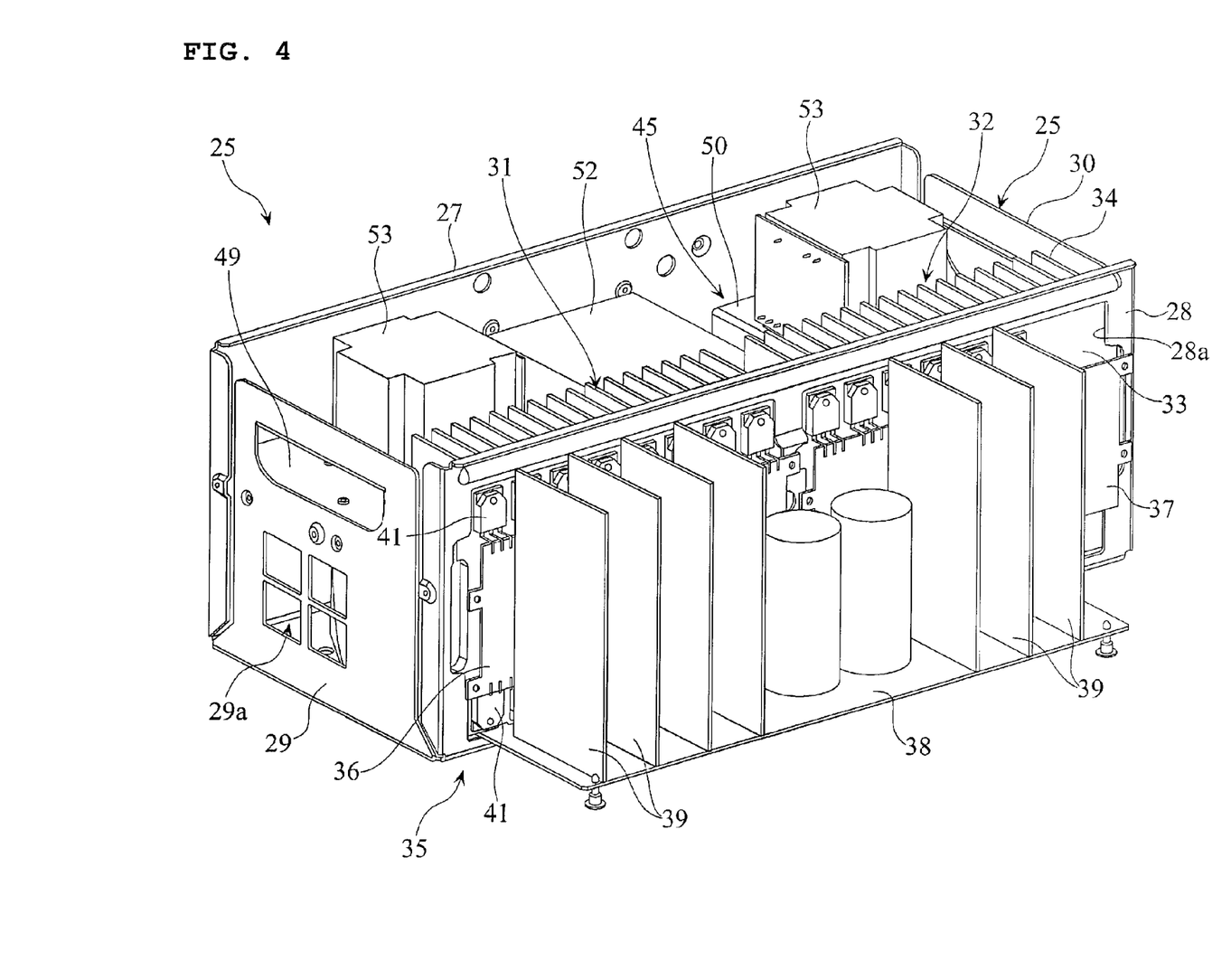
FIG. 4 is a perspective view showing a sub-chassis and components thereon as viewed from behind from a direction slanted upwards and sideways.
Figure 5:
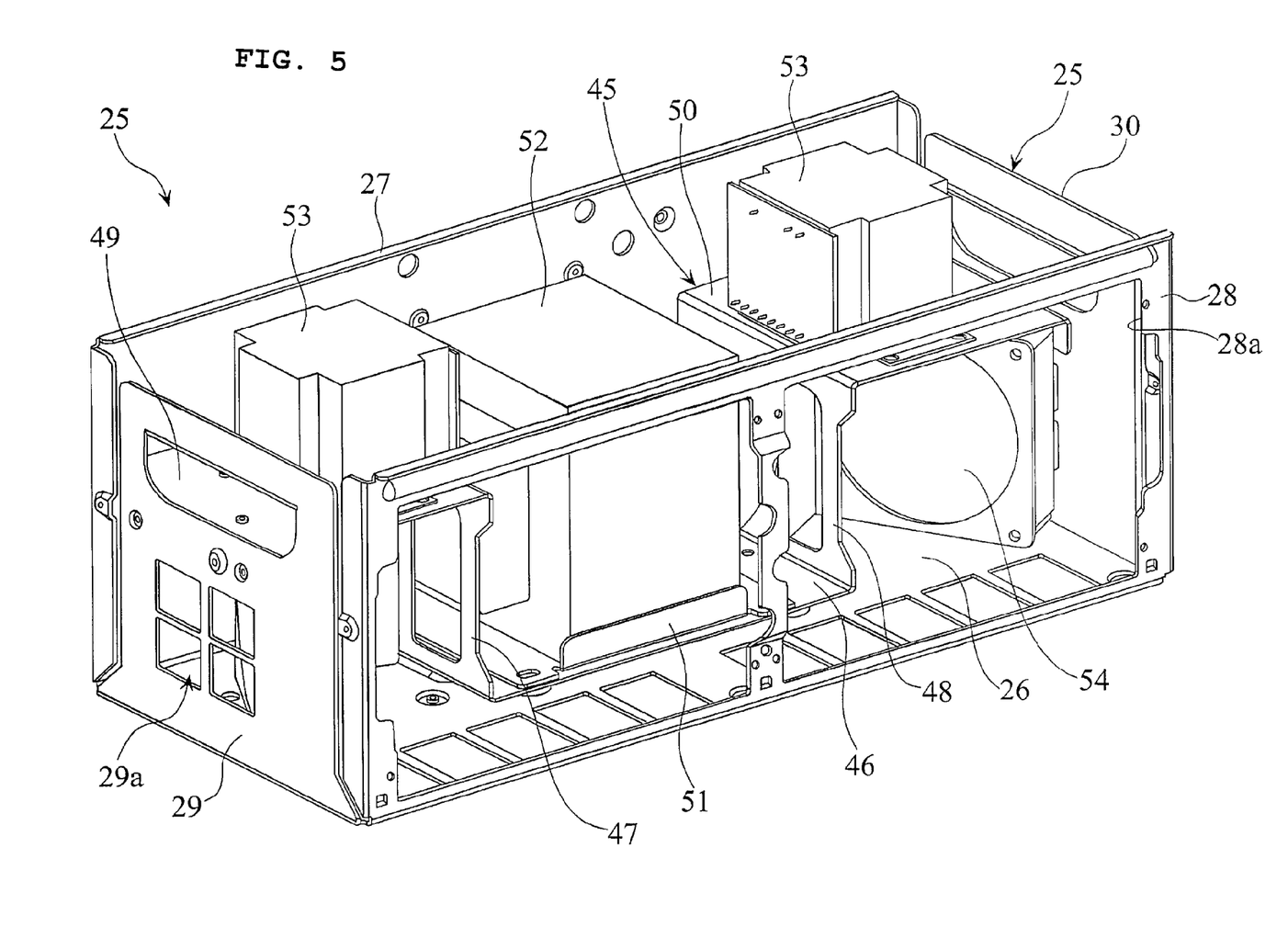
FIG. 5 is a perspective view similar to FIG. 4, except that the components on the sub-chassis are omitted.

FIG. 4 is a perspective view showing the sub-chassis 25 and components thereon as viewed from behind from a direction slanted upwards and sideways. FIG. 5 is a perspective view similar to FIG. 4, except that the heat sinks 31 and 32, a group of amplifier circuit boards 35 (to be described later), etc., are omitted. As shown in FIGS. 3 to 5, the sub-chassis 25 includes a bottom plate member 26, a front plate member 27 extending from the front end of the bottom plate member 26 in a direction perpendicular to the bottom plate member 26, a rear plate member 28 extending from the rear end of the bottom plate member 26 in a direction perpendicular to the bottom plate member 26, a right side plate member 29 and a left side plate member 30 extending from the right and left ends of the bottom plate member 26 in a direction perpendicular to the bottom plate member 26. In other words, the sub-chassis 25 is generally in a box shaped with no upper lid.

The sub-chassis 25 is fastened to the main chassis 11 at a plurality of locations by means of fastening members. More specifically, the sub-chassis 25 is screwed onto the bottom plate member 21 of the main chassis 11 in the bottom plate member 26. The sub-chassis 25 is also screwed onto the right side plate member 22 of the main chassis 11 in the right side plate member 29 and to the left side plate member 23 of the main chassis 11 in the left side plate member 30.

Specifically, the sub-chassis 25 is attached to the main chassis 11 so that the outer surface of the sub-chassis 25 is partially in contact with the inner surface of the main chassis 11 via a plurality of fastening members, but not so that the outer surface of the sub-chassis 25 is fully in contact with the inner surface of the main chassis 11. In other words, the sub-chassis 25 is attached to the main chassis 11 with a predetermined gap between the outer surface of the sub-chassis 25 and the inner surface of the main chassis 11.

As shown in FIG. 4, the rear plate member 28 is provided with an opening 28a that spans substantially across the entire surface of the rear plate member 28. Two heat sinks 31 and 32 are attached to the inner side of the rear plate member 28. The heat sinks 31 and 32 each include a flat-plate base portion 33, and a plurality of flat-plate fins 34 extending from the base portion 33. The heat sinks 31 and 32 are attached to the rear plate member 28 so that the reverse surface of the base portion 33 is exposed through the opening 28a of the rear plate member 28.

The group of amplifier circuit boards 35 is attached to the outer side of the rear surface of the rear plate member 28. The group of amplifier circuit boards 35 includes a plurality of circuit boards each for amplifying an audio signal to be output to one of a plurality of speakers (not shown). More specifically, the group of amplifier circuit boards 35 includes two first boards 36 and 37 provided along the heat sinks 31 and 32, a second board 38 extending in a generally horizontal direction from the lower end of the first boards 36 and 37, and a plurality of (e.g., seven) third boards 39 standing up on the surface of the second board 38.

The first boards 36 and 37 each include a plurality of field effect transistors (FETs) 41. Each field effect transistor 41 has a plurality of terminals extending from the main portion thereof and connected to the first circuit board 36 or 37, with the surface of the main portion being in direct contact with the heat sink 31 or 32.

Ventilation holes 29a and 30a are formed in the right side plate member 29 and the left side plate member 30, respectively. The ventilation holes 29a and 30a are aligned with the ventilation holes 22a and 23a of the side plate members 22 and 23 of the main chassis 11. Thus, when the exhaust fan 54 is ON, the air in the sub-chassis 25 is discharged to the outside via the ventilation holes 29a and 30a in the side plate members 29 and 30 of the sub-chassis 25, the ventilation holes 22a and 23a in the side plate members 22 and 23 of the main chassis 11, and the ventilation holes 13a and 14a in the side panels 13 and 14 of the assembly 1.

Support openings 29b and 30b are formed in the right side plate member 29 and the left side plate member 30, respectively. The support openings 29b and 30b are used in the maintenance of the AV amplifier. Thus, the sub-chassis 25 can be attached to the main chassis 11 as a unit including a component accommodating chassis 45, the group of amplifier circuit boards 35, the heat sinks 31 and 32, etc., combined together as shown in FIG. 4.

More specifically, an operator can unscrew the sub-chassis 25 from the main chassis 11 and lift up the sub-chassis 25 (being a combined unit as shown in FIG. 4) off the main chassis 11 while placing hands in the support openings 29b and 30b. Therefore, when a component on the sub-chassis 25 needs to be replaced or repaired, the sub-chassis 25 can be taken off the main chassis 11 as described above to replace or repair the component. Thus, the ease of maintenance is improved as compared with a case where an intended component cannot be replaced or repaired before most of the other components are taken off.

The component accommodating chassis 45 (corresponding to the "third chassis" of the present invention) is attached to the inside of the sub-chassis 25.

Figure 6:
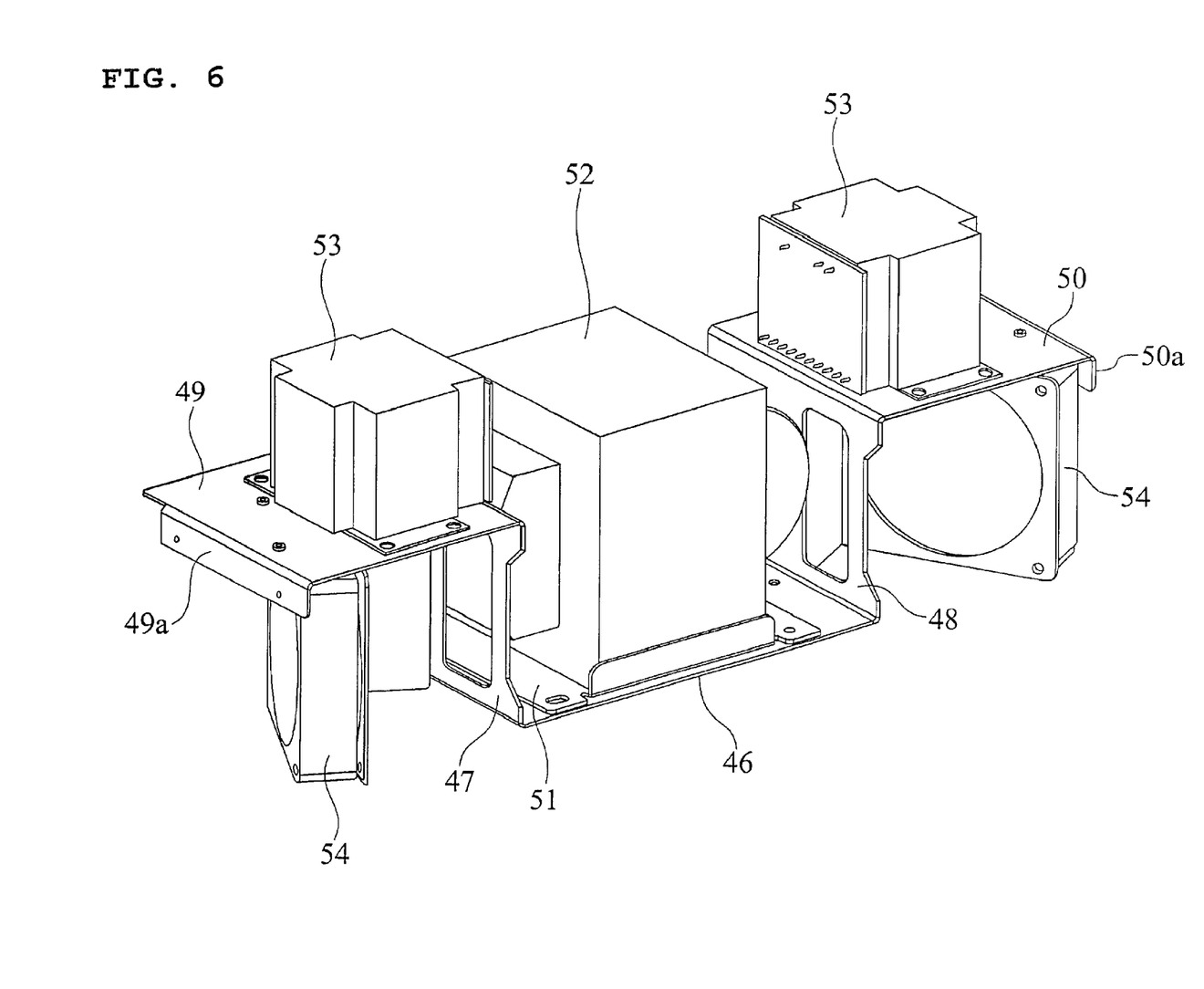
FIG. 6 is a perspective view showing a component accommodating chassis and components attached thereto.

FIG. 6 is a perspective view showing the component accommodating chassis 45 and components attached thereto. FIG. 6 is similar to FIG. 5 without the sub-chassis 25. The component accommodating chassis 45 is generally pedestal-shaped, and includes a central flat plate member 46, a right extension member 47 and a left extension member 48 extending from the right and left ends of the central flat plate member 46 in a direction perpendicular to the central flat plate member 46, a right flat plate member 49 extending in the horizontal direction from the upper end of the right extension member 47, and a left flat plate member 50 extending in the horizontal direction from the upper end of the left extension member 48.

The component accommodating chassis 45 is fastened to the sub-chassis 25 at a plurality of locations by means of fastening members. More specifically, a flange 49a formed at the distal end of the right flat plate member 49 (shown on the left in FIG. 6) of the component accommodating chassis 45 is screwed onto the right side plate member 29 of the sub-chassis 25 and a flange 50a formed at the distal end of the left flat plate member 50 (shown on the right in FIG. 6) is screwed onto the left side plate member 30 of the sub-chassis 25, as shown in FIG. 3. Moreover, the central flat plate member 46 of the component accommodating chassis 45 is screwed onto the bottom plate member 26 of the sub-chassis 25.

Thus, the component accommodating chassis 45 is attached to the sub-chassis 25 so that the outer surface of the component accommodating chassis 45 is partially in contact with the inner surface of the sub-chassis 25 via a plurality of fastening members, but not so that the outer surface of the component accommodating chassis 45 is fully in contact with the inner surface of the sub-chassis 25.

A main transformer (toroidal transformer) 52 is provided on the upper surface of the central flat plate member 46 of the component accommodating chassis 45 via a transformer bracket 51. The main transformer 52 is a component for stepping down the input power source voltage (e.g., an AC 100 V commercial power source voltage) and for providing an insulation. As the power is turned ON, the main transformer 52 receives a relatively large current, and becomes a main source of vibrations.

A sub-transformer 53 is provided directly on the upper surface of each of the right flat plate member 49 and the left flat plate member 50 of the component accommodating chassis 45. The sub-transformer 53 is a component for further stepping down the stepped-down voltage from the main transformer 52 to a predetermined voltage and for providing an insulation. As the power is turned ON, the sub-transformer 53 receives a current, and becomes a source of vibrations.

The exhaust fan 54 hangs down from the lower surface of each of the right flat plate member 49 and the left flat plate member 50 of the component accommodating chassis 45. The exhaust fan 54 is driven by a fan driving circuit (not shown) to discharge the air in the assembly 1. The exhaust fan 54 also becomes a source of vibrations when it is driven as the power is turned ON.

A plurality of signal processing boards 55 (see FIG. 2) are provided on the upper surface of the bottom plate member 21 along the rear end portion of the main chassis 11. Each signal processing board 55 is a printed wiring board being a generally rectangular flat plate for accommodating chip components such as ICs, capacitors and resistors.

The function of the vibration-damping structure of the AV amplifier will now be described. With a configuration as described above, when the power of the AV amplifier is turned ON, a voltage is applied to the main transformer 52 and the sub-transformers 53 and a current flows therethrough. As a current flows through the main transformer 52 and the sub-transformers 53, these components vibrate slightly. Moreover, the exhaust fans 54 are rotated by a driving circuit (not shown) to also vibrate slightly. As the main transformer 52, the sub-transformers 53 and the exhaust fans 54 vibrate slightly, these vibrations are transmitted to the component accommodating chassis 45 on which these components are mounted.

Since the component accommodating chassis 45 is fastened to the sub-chassis 25 so as to be partially in contact with the sub-chassis 25 via a plurality of fastening members, the vibrations of the component accommodating chassis 45 are attenuated while being transmitted to the sub-chassis 25. Similarly, since the sub-chassis 25 is fastened to the main chassis 11 so as to be partially in contact with the main chassis 11 via a plurality of fastening members, the vibrations of the sub-chassis 25 are further attenuated while being transmitted to the main chassis 11.

Thus, in the AV amplifier of the present embodiment, the main transformer 52, the sub-transformers 53 and the exhaust fans 54, being sources of vibrations, are fastened to the component accommodating chassis 45 at a plurality of positions, whereby vibrations generated by these vibrating components are transmitted to the component accommodating chassis 45 via the fastening positions. Moreover, the sub-chassis 25 is provided between the component accommodating chassis 45 and the main chassis 11, wherein the component accommodating chassis 45 and the sub-chassis 25 are fastened to each other at plurality of positions, and the sub-chassis 25 and the main chassis 11 are fastened to each other at plurality of positions so that the vibration of the component accommodating chassis 45 is transmitted to the sub-chassis 25 via the fastening positions therebetween, and the vibration of the sub-chassis 25 is transmitted to the main chassis 11 via the fastening positions therebetween.

Therefore, the vibrations from the main transformer 52, the sub-transformers 53 and the exhaust fans 54 are attenuated as they travel down the transmission path. The vibration is sufficiently attenuated when it is transmitted to the main chassis 11. Thus, it is possible to sufficiently suppress the adverse influence on the audio signal, which is processed by the signal processing board 55 mounted on the main chassis 11.

With the vibration-damping structure of the present embodiment, the assembly 1 can be considered to serve a function similar to that of a resonant cavity of a musical instrument for mixing together frequency components. However, the transmission path of the vibrations from the main transformer 52, the sub-transformers 53 and the exhaust fans 54 to the signal processing board 55 mounted on the main chassis 11 is formed by a plurality of chassis having three-dimensional configurations with the chassis 11, 25 and 45 being coupled together at a plurality of positions. Therefore, it is possible to desirably attenuate only the vibration-induced frequency components while suppressing the attenuation of frequency components that are necessary for the audio signal. Thus, it is possible to provide an AV amplifier capable of outputting an audio signal of a desirable sound quality.

It is understood that the present invention is not limited to the embodiment set forth above. For example, the shapes of the main chassis 11, the sub-chassis 25 and the component accommodating chassis 45 are not limited to those described in the embodiment above. Moreover, the number of chassis to be provided between the vibration source to the signal processing board 55 is not limited to that specified in the embodiment above. Moreover, the vibration sources are not limited to the main transformer 52, the sub-transformers 53 and the exhaust fans 54 as described above.

What is claimed is:

1. A vibration-damping structure for an audio apparatus, comprising:

a first chassis to which a signal processing board for processing an audio signal is attached, the first chassis defining a portion of an outer shape of an assembly of the vibration-damping structure for dampening vibration from a vibrating component;

a second chassis fastened to an inner surface of the first chassis so as to be partially in contact with the inner surface of the first chassis via a plurality of fastening members; and a third chassis fastened to an inner surface of the second chassis so as to be partially in contact with the inner surface of the second chassis via other fastening members, wherein the first chassis includes a generally rectangular first bottom plate member, and first side plate members respectively extending from each of opposite end portions of the first bottom plate member in a direction perpendicular to the first bottom plate member;

the second chassis includes a generally rectangular second bottom plate member and second side plate members respectively extending from each of opposite end portions of the second bottom plate member in a direction perpendicular to the second bottom plate member, the third chassis includes a generally rectangular central plate member, extension members respectively extending from each of opposite end portions of the central plate member in an upper direction perpendicular to the central plate member, and parallel plate members respectively extending from an upper end portion of each of the extension members in an outer direction in parallel to the central plate member, a first vibrating component is fixed to the central plate member, and a second vibrating component is fixed to at least one of the parallel plate members, wherein the vibration of the first and second vibrating components is suppressed relative to the signal processing board attached to the first chassis.

2. The vibration-damping structure for an audio apparatus according to claim 1, wherein:

the second side plate members are fixed to inner surfaces of the respective first side plate members of the first chassis, and the second bottom plate member is fixed to an inner surface of the first bottom plate member of the first chassis.

3. The vibration-damping structure for an audio apparatus according to claim 1, wherein a distal end of each parallel plate member is fixed to a respective one of the second side plate members of the second chassis.

4. The vibration-damping structure for an audio apparatus according to claim 1, wherein the first vibrating component is a power transformer, and the power transformer is fixed to an upper surface of the central plate member of the third chassis.

5. The vibration-damping structure for an audio apparatus according to claim 1, wherein:

the second vibrating component is an exhaust fan; and
the exhaust fan hangs down from a lower surface of the parallel plate member of the third chassis.

\* \* \* \* \*